United States Patent [19]

Hazan et al.

[11] 4,042,478

[45] Aug. 16, 1977

[54] PROCESS FOR ELECTROCOATING AN AQUEOUS COMPOSITION OF THE REACTION PRODUCT OF AN EPOXY ESTER RESIN AND A MALEINIZED DRYING OIL BLENDED WITH A CROSS-LINKING AGENT

[75] Inventors: Isidor Hazan, Clementon, N.J.; Robert N. Iacona, Newtown Square, Pa.

[73] Assignee: E. I. Du Pont de Nemours and Company, Wilmington, Del.

[21] Appl. No.: 643,389

[22] Filed: Dec. 22, 1975

Related U.S. Application Data

[62] Division of Ser. No. 493,067, July 30, 1974, Pat. No. 3,954,688.

[51] Int. Cl.² .............................................. C25D 13/06
[52] U.S. Cl. ...................................... 204/181; 427/27
[58] Field of Search ........................... 204/181; 427/27

[56] References Cited

U.S. PATENT DOCUMENTS 3,730,926   5/1973   Guldenpfennig .................... 204/181
3,738,925   1/1973   Cooke ................................. 204/181

*Primary Examiner*—Howard S. Williams

[57] ABSTRACT

The aqueous coating composition contains film-forming constituents dispersed in an aqueous medium;

the film-forming constituents are
 a. the reaction product of
  1. an epoxy ester resin such as an epoxy hydroxy polyether resin and drying oil fatty acids, and
  2. maleinized drying oil, and
 b. a water dispersible cross-linking agent such as benzoguanamine formaldehyde;

the composition is neutralized to a pH of 7.2–10 with a basic compound such as potassium hydroxide or an amine;

the composition is applied by convention spray techniques or by electrodeposition and is useful as a primer or as a primer surfacer for automobile and truck bodies and small metal parts used in the manufacture of automobiles and trucks. Finishes of acrylic lacquers, acrylic enamels, acrylic dispersion lacquers or enamels or acrylic powders can be applied over the primed substrates.

6 Claims, No Drawings

PROCESS FOR ELECTROCOATING AN AQUEOUS COMPOSITION OF THE REACTION PRODUCT OF AN EPOXY ESTER RESIN AND A MALEINIZED DRYING OIL BLENDED WITH A CROSS-LINKING AGENT

This is a division of application Ser. No. 493,067, filed July 30, 1974, now U.S. Pat. No. 3,954,688.

BACKGROUND OF THE INVENTION

This invention relates to an aqueous coating composition and in particular to an aqueous thermosetting coating composition that can be electrodeposited or applied by conventional techniques.

It is well known to electrodeposit carboxylic polymers as shown in Gilchrist U.S. Pat. No. 3,230,162, issued Jan. 18, 1966; Gilchrist U.S. Pat. No. 3,362,899, issued Jan. 9, 1968; Sekmakas et al. U.S. Pat. No. 3,516,913, issued June 23, 1970 and Sekmakas et al. U.S. Pat. No. 3,536,641, issued Oct. 27, 1970. Coating compositions of epoxy ester resins have been applied by electrodeposition as have coating compositions of resins of maleinized drying oils but these compositions either had inadequate throwing power or poor stability in the electrocoating bath or finishes from these compositions had unacceptable corrosion and saponification resistance. Compositions in which these resins were blended had similar failings and often exhibited preferential deposition of one of the resins in the electrocoating process.

The novel composition of this invention utilizes the reaction product of an epoxy ester resin and a maleinized drying oil to form a coating composition for electrodeposition which has excellent throwing power, good bath stability, good corrosion and a saponification resistance. The novel composition also can be applied by conventional techniques and can be used as a primer surfacer composition.

SUMMARY OF THE INVENTION

The novel aqueous coating composition of this invention has a pH of about 7.2-10 and comprises 5-50% by weight of film-forming constituents uniformly dispersed in an aqueous medium; wherein the film-forming constituents consist essentially of
a. 50-97% by weight, based on the weight of the film-forming constituents, of a polymer which is the reaction product of
 1. an epoxy ester resin, and
 2. a maleinized drying oil, and the polymer has an acid number of 20-100; and correspondingly,
b. 3-50% by weight, based on the weight of the film-forming constituents, of a water dispersible cross-linking agent; and
wherein the film-forming constituents are neutralized to the above pH with a basic compound.

DESCRIPTION OF THE INVENTION

The novel aqueous coating composition of this invention has a solids content of film-forming constituents of about 5-50% by weight and preferably, 10-40% by weight. For conventional spray application purposes, the composition has a solids content of about 15-30% by weight. When the novel composition is applied by electrodeposition, the polymer solids content is reduced to about 2-35% by weight.

Preferably, the film-forming constituents of the novel coating composition comprise 60-95% by weight of a polymer that has reactive hydroxyl and carboxyl groups, an acid number of about 20 to about 100. Preferably, to form a high quality composition, the polymer has an acid number of about 30-60. The remainder of the film-forming constituents comprise about 5-40% by weight of the water dispersible cross-linking agent that is blended with the polymer to form the novel coating composition.

To uniformly disperse the polymer in aqueous media, the polymer is neutralized with a basic compound such as alkali metal hydroxide, an amine, a water soluble polyamine or a hydroxyamine.

The polymer used in the novel coating composition of this invention is the reaction product of an epoxy ester resin and a maleinized drying oil. The epoxy ester resin is the esterification product of an epoxy hydroxy polyether resin and drying oil fatty acids. The maleinized drying oil is the reaction product of a drying oil and maleic anhydride.

The polymer is prepared by conventional techniques in which the epoxy ester resin and the maleinized drying oil (preferably in which the maleic anhydride constituent has been opened to the acid form) and an esterification catalyst are reacted for about 2-8 hours at about 120°-200° C. to form the polymer. The polymer has a Gardner Holdt of about $Z_1$-$Z_6$ measured at 25° C. on a 75% weight solids polymer solution using ethylene glycol monobutyl ether solvent. The resulting polymer then can be neutralized with a basic compound and inverted into a water dispersion.

Typical esterification catalysts that are used to prepare the polymer are ammonium compounds, such as benzyl trimethyl ammonium hydroxide and tetramethyl ammonium chloride; organic tin compounds, such as dibutyl tin dilaurate, dibutyl tin oxide and the like; titanium complexes and litharge. About 0.1-4% by weight, based on the total weight of the polymeric constituents used to prepare the polymer, of the catalyst is used.

Typical solvents and diluents which are used to prepare the polymer are, for example, toluene, xylene, butyl acetate, acetone, methylisobutyl ketone, methylethyl ketone, isopropanol, butanol, hexane, ethylene glycol monoethyl ether, ethylene glycol monoethyl ether acetate, V M and P naphtha, mineral spirits and other aliphatic, cycloaliphatic, aromatic hydrocarbons, esters, ethers, ketones and alcohols. Preferably, water miscible solvents are used such as acetone, ethylene glycol monoethyl ether, isopropanol and the like.

The maleinized drying oil used to prepare the polymer is prepared by reacting maleic anhydride with one or more of the conventional drying oils at about 170° C. to 210° C. for about 2 to 5 hours. Typical drying oils that can be used are linseed oil, tung oil, soya oil, tall oil and dehydrated castor oil. Linseed oil is preferred to form a high quality product.

The epoxy ester resin used to prepare the polymer is the esterification product of an epoxy hydroxy polyether resin and drying oil fatty acids of one of the aforementioned drying oils. Tall oil fatty acids are preferred. The epoxy resin, drying oil fatty acids and one of the aforementioned catalysts are reacted for about 1-6 hours at about 100°-200° C. to form the epoxy ester resin. Preferably, to form a highly reactive epoxy ester resin the ratio of epoxy resin to fatty acids is used to provide for a resin having a terminal epoxide group.

Typical epoxy resins that are used to prepare the epoxy ester resin have the following structure

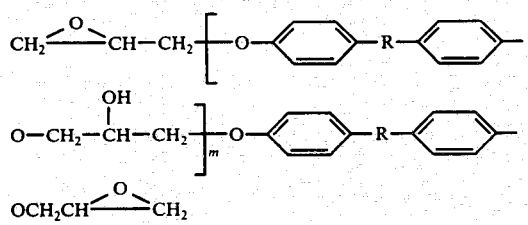

where R is an alkylene group of 1-4 carbon atoms and m is a positive integer sufficiently large to provide a resin having a Gardner Holdt Viscosity of A to $Z_5$ measured at 25° C on a 40% weight solids polymer solution using ethylene glycol monobutyl ether solvent. These resins have an Epoxide Equivalent* of 230–4000.
*Epoxide Equivalent - grams of resin containing one gram - equivalent of epoxide.

One preferred epoxy resin is the reaction product of epichlorohydrin and bisphenol A which provides a resin in which R is

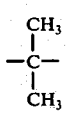

One particularly preferred epoxy resin of this type which improves the durability of finishes formed from compositions of this invention has a Gardner Holdt viscosity, measured as above, of D-G.

Another very useful epoxy resin is the reaction product of epichlorohydrin and bisphenol F which provides a resin in which R is -$CH_2$-.

To prepare the aqueous coating composition of this invention, the carboxyl and hydroxyl containing polymer is prepared preferably in a water miscible solvent, neutralized with a basic compound and dispersed in water and then is blended with the cross-linking agent and optionally with a pigment dispersion. A sufficient amount of the basic compound is added to adjust the pH of the composition to a pH of about 7.2–10 and preferably 7.5–8.5.

Typical basic compounds that can be used in the novel composition are primary amines, secondary amines, tertiary amines, a water soluble polyamine, hydroxyamines and alkali metal hydroxides. The following are typical examples of these compounds: ethanolamine, diethanolamine, triethanolamine, diethylethanolamine, N-methylethanolamine, N-aminoethylethanolamine, N-methyldiethanolamine, dimethylaminoethanol, monoisopropanolamine, diisopropanolamine, triisopropanolamine, hydroxyamine, butanolamine, hexanolamine, methyldiethanolamine, sodium hydroxide, potassium hydroxide, lithium hydroxide, ethylene diamine, diethylenetriamine, diethylenetetraamine, hexamethylenetetramine, tetraethyldiamine, propylenediamine, 1,3-diaminopropane, diamino-bis-propylamine, monodi-N-trialkylamines in which the alkyl groups have 1-8 carbon atoms. The reaction products of the alkylene oxides and propylamine can also be used.

Typical water-dispersible cross-linking agents that can be used in the novel composition are melamine formaldehyde, alkylated melamine formaldehyde resins such as hexa kis-(methoxymethyl) melamine and partially methylated melamine formaldehyde resins, butylated melamine formaldehyde resins, benzoguanamine formaldehyde resins, methylated urea formaldehyde resins, urea formaldehyde resins, phenol formaldehyde and the like. One particularly useful resin which forms a high quality primer useful resin is an anionic benzoguanamine formaldehyde resin.

The novel coating composition of this invention can contain 0.5–50% by weight, based on the weight of the film-forming constituents, of pigments. Pigments are added to the composition in the usual manner by forming a mill base or pigment dispersion with the pigment and the aforementioned carboxyl and hydroxyl containing polymer or another water dispersible polymer. This mill base is then blended with the film-forming constituents and the composition is dispersed in water. Typical pigments that can be used are metallic oxides such as titanium dioxide, zinc oxide, iron oxide, and the like, metal hydroxides, metal flakes such as aluminum flake, metal powders, "Afflair" pigments, chromates, such as lead chromates, sulfates, carbonates, carbon black, silica, talc, china clay, aluminum silicate, organic dyes or organic pigments.

The novel coating composition of this invention can be applied by any of the conventional methods such as spraying, electrostatic spraying, dipping, brushing, flow coating and the like, and then the coating is baked for about 5–40 minutes at about 125°–250° C. to give coatings about 0.1–5 mils thickness.

The novel coating composition of this invention is particularly designed to be applied by an electrocoating process in which the article to be electrocoated is positioned in a conventional electrocoating cell and forms the anode of the electrocoating cell. The novel coating composition of this invention is generally diluted with water to a solids content of about 2–35% by weight and it forms the bath of the coating cell. Electrical current is passed through the cell and the negatively charged film-forming polymer particles and polymer coated pigment particles are deposited on the anode. When the coating reaches the desired thickness, the article is removed from the bath, washed with water and baked at the aforementioned times and temperature.

The current density used in electrocoating cells generally does not exceed 0.3 amperes/in.[2] of anode surface which is immersed in the bath and it is preferable to use less. Voltages of about 50–500 volts can be used but voltages of about 50–200 are preferred for most applications.

In any electrocoating process in which articles are passed into the electrocoating bath, electrocoated and removed, it is preferred to replenish the bath with the coating composition. However, the replenishment composition used to replenish the electrocoating bath is different from the electrocoating bath. The reason is that as the film forming constituents are being electrodeposited, the neutralization agent or basic compound, e.g., an amine or potassium hydroxide, remains in the bath. Therefore, the replenishment composition contains only a small amount or none of the basic compound so that the pH of the bath will remain at a constant level. Also, the replenishment composition has a substantially increased content of film forming constituents to keep the solids content of the electrocoating bath at a constant level.

One useful replenishment composition has a content of film forming constituents of 60–90% by weight in a solvent for the constituents. About 75-85% by weight of film forming constituents is preferred for a high quality composition. The film forming constituents of polymer and crosslinking agent are present in the same percentages as for the novel coating composition. The film forming constituents can be neutralized from about 0-50% but preferably, the film forming constituents are neutralized from about 15-30%, to insure dispersion of the constituents in the auqeous electrocoating bath. The replenishment composition can contain pigments and if pigmented contains about 5-50% by weight, based on the weight of the film forming constituents, of pigments.

The novel composition of this invention is useful as a primer over treated and untreated steel, aluminum and other metals. Conventional acrylic enamels and acrylic dispersion enamels can be applied directly to primer finishes of the novel composition. Acrylic lacquers and acrylic dispersion lacquers, acrylic powder coatings can be applied over the novel composition but a suitable intermediate sealer coat is usually used to improve adhesion of the lacquer or powder topcoat.

By selecting the appropriate pigmentation and the basic compound, the novel composition of this invention can be used as a primer surface composition which is applied over all types of painted and unpainted substrates including the primers formulated from the novel composition. Primer surfacer finishes of the novel composition have excellent adhesion to the substrate and acrylic enamels and acrylic dispersion enamels can be applied directly to these finishes.

The following Examples illustrate the invention. Quantities are on a weight basis unless otherwise indicated.

EXAMPLE 1

The following ingredients are charged into a reaction vessel equipped with a stirrer, thermometer, reflux condenser and a heating mantle to form an epoxy ester resin solution:

|  | Parts By Weight |
|---|---|
| Portion 1 | |
| Epoxy Resin (Epon 1001*) | 559.00 |
| Portion 2 | |
| Tall oil fatty acids | 167.70 |
| Benzyl trimethylammonium hydroxide | 0.55 |
| Portion 3 | |
| Ethylene glycol monoethyl ether | 139.75 |
| Total | 867.00 |

*Epon 1001 - an epoxy resin of the formula

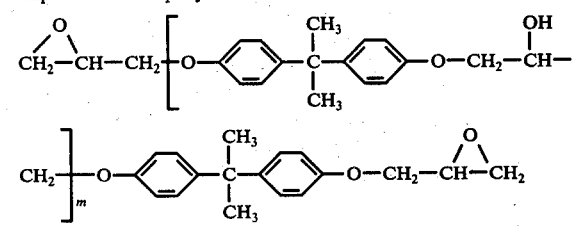

where m is an integer sufficiently large to provide a Gardner Holdt viscosity at 25° C. of D-G measured on a 40% weight solids polymer solution using ethylene glycol monobutyl ether solvent and the resin has an Epoxide Equivalent of 450-550.

Portion 1 is charged into the reaction vessel and blanketed with nitrogen and heated to about 138°-150° C. to melt the resin. Portion 2 is then added and the ingredients are heated to about 150°-160° C. for about 3 hours with constant agitation until the reaction mixture has an acid number of 0. Portion 3 is added and the ingredients are cooled and filtered.

The resulting epoxy ester resin solution has a solid content of about 84%, an acid number of 0, an epoxide equivalent of 1200-1300 and a Gardner Holdt viscosity of D-F at 25° C. on a 40% solids polymer solution using ethylene glycol monoethyl ether solvent.

An aqueous polymer dispersion is prepared as follows:

|  | Parts By Weight |
|---|---|
| Portion 1 | |
| Maleinized linseed drying oil (acid number 70-80, Gardner Holdt viscosity of T-U at 25° C. measured on a 75% solids polymer solution using xylene as the solvent) | 124.58 |
| Portion 2 | |
| Benzyl trimethyl ammonium hydroxide | 0.09 |
| Deionized water | 6.18 |
| Portion 3 | |
| Epoxy ester resin solution (prepared above) | 214.98 |
| Benzyl trimethyl ammonium hydroxide | 0.13 |
| Portion 4 | |
| Potassium hydroxide solution (45% aqueous solution of potassium hydroxide) | 21.14 |
| Deionized water | 503.90 |
| Total | 871.00 |

Portion 1 is charged into a reaction vessel equiped as above and covered with nitrogen and heated to about 40°-50° C. Portion 2 is added and the reaction mixture is heated to about 100°-110° C. and held at this temperature for 4 hours. Portion 3 is preheated to about 40°-50° C. and then charged into the reaction vessel and the reaction mixture is held at about 125°-135° C. for about 5 hours. The resulting composition has an acid number of about 35-50 and a Gardner Holdt viscosity of about $Z_3$-$Z_4$ measured at 25° C. on a 75% solids polymer solution using ethylene glycol monobutyl ether solvent. Portion 4 is premixed. The above composition is added to Portion 4 with constant agitation and the reaction mixture is cooled to room temperature.

The resulting dispersion has a solids content of about 36% and a pH of about 8-9.

A black pigment dispersion is then prepared as follows:

|  | Parts By Weight |
|---|---|
| Aqueous Polymer dispersion (prepared above) | 78.42 |
| Carbon black pigment | 12.55 |
| Deionized water | 9.03 |
| Total | 100.00 |

The above ingredients are charged into a conventional 15 gallon sand mill and ground at a rate of 30 gallons per minute while controlling the temperature of the mixture below 70° C. The resulting carbon black dispersion has about a 40% solids content.

A coating composition is prepared by blending together the following ingredients:

|  | Parts By Weight |
|---|---|
| Portion 1 | |
| Aqueous polymer dispersion (prepared above) | 639.58 |
| Portion 2 | |
| Black pigment dispersion (prepared above) | 40.23 |
| Portion 3 | |

|  | Parts By Weight |
|---|---|
| Benzoguanamine formaldehyde resin solution (85% benzoguanamine formaldehyde resin in ethylene glycol monobutyl ether) | 65.18 |
| Portion 4 | |
| Potassium hydroxide solution (45% aqueous solution of potassium hydroxide) | 8.43 |
| Deionized water | 41.42 |
| Portion 5 | |
| Deionized water | 74.16 |
| Total | 869.00 |

Portion 1 is charged into a mixing vessel and then Portion 2 is added with constant agitation of the ingredients. Portion 3 is added and mixed for 30 minutes. Portion 4 is premixed and added slowly to the batch with agitation over a 20 minute period. Then Portion 5 is added. The resulting composition has a solids content of about 35%, a pH of about 8 and a specific resistivity of about 300–400 ohm-centimeters.

The coating composition is diluted to about a 13% solids content with deionized water and charged into a stainless steel tank. A phosphatized steel panel is positioned in about the center of the tank. The panel is electrically connected to a positive side of a direct current (D.C.) power source and is the anode of the electrocoating cell. The tank is connected to the negative side of a D.C. power source and forms the cathode of the cell. A direct current of 175 volts is applied to the cell for 2 minutes and a paint film of about 0.6 mil is deposited on the panel. The coated metal panel is removed from the electrocoating cell, washed, dried and baked at about 165° C. for 30 minutes. The resulting primer film has excellent adhesion to the metal substrate, is hard and has good corrosion and saponification resistance. An arcylic enamel adheres to the primer film and conventional acrylic lacquers can be applied with a conventional sealer coat over the primer to form a high quality finish.

This coating composition is particularly useful for priming automobile and truck bodies by electrodeposition of the composition.

EXAMPLE 2

A coating composition is prepared by blending together the following ingredients:

|  | Parts By Weight |
|---|---|
| Portion 1 | |
| Aqueous polymer dispersion (prepared in Example 1) | 734.71 |
| Portion 2 | |
| Black pigment dispersion (prepared in Example 1) | 40.36 |
| Portion 3 | |
| Benzoguanamine formaldehyde resin solution (described in Example 1) | 35.07 |
| Portion 4 | |
| Potassium hydroxide solution (described in Example 1) | 0.26 |
| Portion 5 | |
| Deionized water | 55.60 |
| Total | 866.00 |

Portion 1 is charged into a mixing vessel and then Portion 2 is added with constant agitation of the ingredients. Portion 3 is added and mixed for 30 minutes. Portion 4 is added with mixing and then Portion 5 is added with mixing. The resulting composition is then filtered through a 40 mesh nylon bag. The resulting composition has a solids content of about 36%, a pH of about 8 and a specific resistivity of about 300–400 ohm-centimeters.

The coating composition is diluted to about a 13% solids content with deionized water and charged into a stainless steel tank. A phosphatized steel panel is electrically connected to the positive side of a D.C. power source and forms the anode of the electrocoating cell. The tank is connected to the negative side of a D.C. power source and forms the cathode of the cell. A direct current of about 175 volts is applied to the cell for 2 minutes and a paint film of about 0.6 mil is deposited on the panel. The coated panel is removed from the electrocoating cell, washed, dried and baked at about 165° C. for 30 minutes. The resulting primer film has excellent adhesion to the metal substrate, is hard and has good corrosion and saponification resistance. An acrylic enamel adheres to the primer film and conventional acrylic lacquers can be applied with a conventional sealer coat over the primer to form a high quality finish.

This coating composition is particularly useful for priming small metal parts used in the manufacture of trucks and automobiles.

EXAMPLE 3

An aqueous polymer dispersion is prepared as follows:

|  | Parts By Weight |
|---|---|
| Portion 1 | |
| Maleinized linseed oil (described in Example 1) | 12.56 |
| Portion 2 | |
| Benzyl trimethyl ammonium hydroxide | 0.01 |
| Deionized water | 0.62 |
| Portion 3 | |
| Epoxy ester resin solution (described in Example 1) | 27.99 |
| Benzyl trimethyl ammonium hydroxide | 0.01 |
| Portion 4 | |
| Dimethylamino ethanol | 2.45 |
| Deionized water | 62.68 |
| Total | 106.32 |

Portion 1 is charged into a reaction vessel equipped as in Example 1 and covered with nitrogen and heated to about 40°–50° C. Portion 2 is added and the reaction mixture is heated to about 100°–110° C. and held at this temperature for 4 hours. Portion 3 is preheated to about 40°–50° C. and then charged into the reaction vessel and the mixture is held at about 125°–135° C. for about 5 hours. The resulting composition has an acid number of about 35–50 and a Gardner Holdt viscosity measured as in Example 1 of $Z_3$–$Z_4$. The composition is added to Portion 4 with constant agitation and the mixture is cooled to room temperature.

A mill base is prepared as follows:

|  | Parts By Weight |
|---|---|
| Aqueous polymer dispersion (prepared above) | 37.48 |
| Defoamer | 0.59 |
| Deionized water | 14.94 |
| Talc pigment | 6.29 |
| Carbon black pigment | 3.66 |
| Aluminum silicate | 27.70 |
| Titanium dioxide pigment | 6.67 |

| | Parts By Weight |
|---|---|
| Corrosion inhibitor (Molywhite 212-zinc/ calcium/molybdate compound) | 2.67 |
| Total | 100.00 |

The above ingredients are charged into a conventional sand mill and ground to form a pigment dispersion as in Example 1.

A primer then is prepared as follows:

| | Parts By Weight |
|---|---|
| Aqueous polymer dispersion (prepared above) | 17.22 |
| Mill base (prepared above) | 74.56 |
| Hexakis (methoxymethyl) melamine | 2.51 |
| Deionized water | 5.71 |
| Total | 100.00 |

The above primer is then applied by conventional spraying to panels of phosphatized steel substrates, steel panels primed with conventional alkyd resin primer and steel panels having an electrocoated primer of Example 1. The coated steel panels are baked for 30 minutes at 165° C. and each of the resulting films is about 0.8 mils thick, has good corrosion and saponification resistance and has excellent adhesion to the metal substrate.

An acrylic enamel adheres to the primer to form a high quality finish for automobiles or trucks.

The invention claimed is:

1. In the process for electrocoating a film-forming polymer composition on the anode of an electrocoating cell, said anode consisting of a metal article, by immersing said anode in a coating bath containing uniformly dispersed constituents, passing direct current through said cell to deposit a coating on the anode, removing the coated anode from the bath and baking the coated anode to form a continuous film thereon, the improvement therewith comprises utilizing a coating bath of
an aqueous coating composition having a pH of about 7.2-10 comprising 5-50% by weight of film-forming constituents uniformly dispersed in an aqueous medium;
wherein the film-forming constituents consist essentially of
a. 50-97% by weight, based on the weight of the film-forming constituents, of a polymer which is the reaction product of
1. an epoxy ester resin of an epoxy resin of the formula

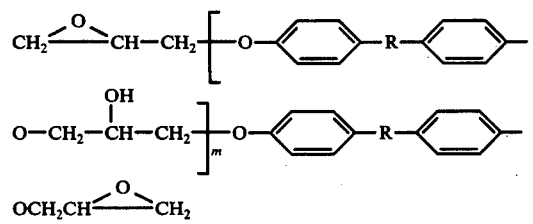

where R is an alkylene group having 1-4 carbon atoms and m is a positive integer sufficiently large to provide a Gardner Holdt viscosity of A to $Z_5$ measure at 25° C. on a 40% weight solids polymer solution using ethylene glycol monobutyl ether solvent; and drying oil fatty acids selected from the group consisting of linseed oil fatty acids, tung oil fatty acids, dehydrated castor oil fatty acids, soya oil fatty acids and tall oil fatty acids; and 2. a malenized drying oil which is the reaction product of maleic anhydride and a drying oil selected from the group consisting of linseed oil, tung oil, dehydrated caster oil, soya oil and tall oil; and b. 3-50% by weight, based on the weight of the film-forming constituents, of a water dispersible cross-linking agent selected from the group consisting of phenol formaldehyde, urea formaldehyde, methylated urea formaldehyde, melamine formaldehyde, alkylated melamine formaldehyde having 1-4 carbon atoms in the alkyl group and benzoguanamine formaldehyde;

wherein the composition contains sufficient basic compound to have said pH and wherein the basic compound is selected from the group consisting of an alkali metal hydroxide, an amine or a polyamine.

2. The process of claim 1 in which the aqueous coating composition contains 0.5-50% by weight, based on the weight of the film-forming constituents, of pigment.

3. The process of claim 2 in which R is either methylene or isopropylidene.

4. The process of claim 2 in which the cross-lining agent is benzoguanamine formaldehyde or hexakis (methoxymethyl) melamine.

5. The process of claim 2 in which the film-forming constituents consist essentially of
60-95% by weight of said polymer; and correspondingly,
5-40% of a water dispersible cross-linking agent.

6. The process of claim 2 in which the aqueous coating composition has a pH of about 7.5-8.5 and comprises 10-40% by weight of film-forming constituents uniformly dispersed in an aqueous medium;
wherein the film-forming constituents consist essentially of
a. 60-95% by weight, based on the weight of the film-forming constituents, of a polymer which is the reaction product of
1. an epoxy ester resin of an epoxy resin of the formula

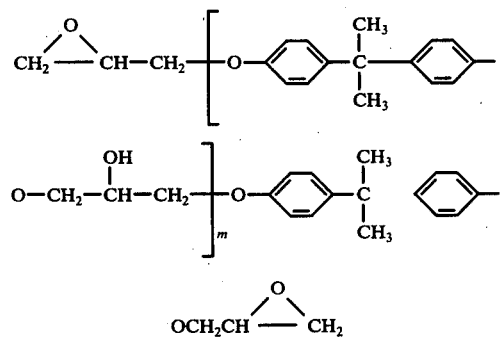

wherein m is a positive integer sufficiently large to provide a Gardner Holdt viscosity of D-G measure at 25° C. on a 40% weight solids polymer solution using ethylene glycol monobutyl ether solvent; and drying oil fatty acids selected from the group consisting of linseed oil fatty acids, tung oil fatty acids, dehydrated castor oil fatty acids, soya oil fatty acids and tall oil fatty acids; and 2. a maleinized drying oil which is the reaction product of maleic anhydride and a drying oil selected from the group consisting of linseed oil, tung oil, dehydrated castor oil, soya oil and tall oil; and the polymer has an acid number of about 30–60 and a Gardner-Holdt viscosity of $Z_1$-$Z_6$ measured at 25° C. on a 75% weight solids polymer solution using ethylene glycol monobutyl ether solvent; and correspondingly, b. 5–40% by weight, based on the weight of the film-forming constituents, of a benzoguanamine formaldehyde or hexakis(mehtoxymethyl) melamine cross-linking agent; and wherein the composition contains sufficient potassium hydroxide or dimethylamino ethanol to have said pH.

* * * * *